R. L. Payne,
Cage Trap,
No. 21,978. Patented Nov. 2, 1858.
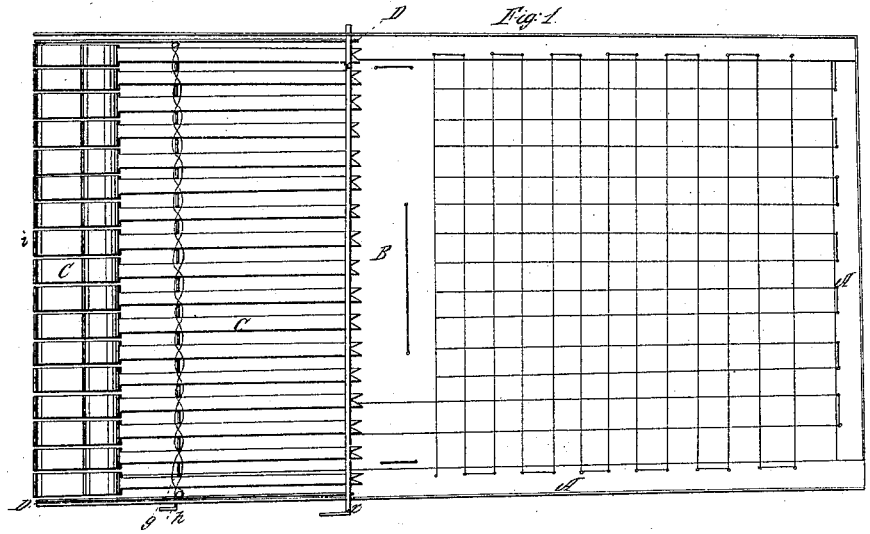
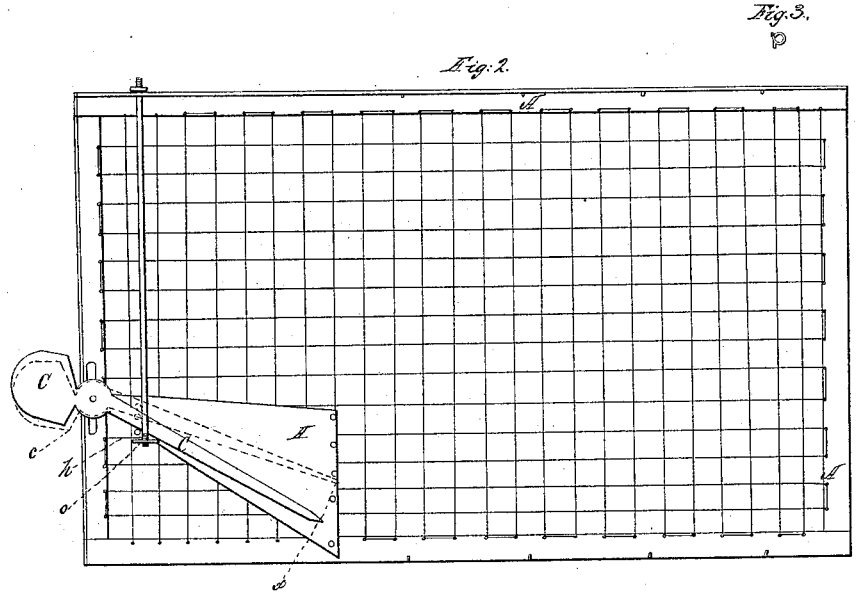
Witnesses:
S. J. Bowen
D. Breed
Inventor:
Reuben L. Payne

UNITED STATES PATENT OFFICE.

REUBEN L. PAYNE, OF HALIFAX, VIRGINIA.

TRAP FOR ANIMALS.

Specification of Letters Patent No. 21,978, dated November 2, 1858.

*To all whom it may concern:*

Be it known that I, REUBEN L. PAYNE, of Halifax, in the county of Halifax and State of Virginia, have invented certain new and useful Improvements in Traps; and I do hereby declare that the following is a full and exact description thereof, reference being had to the accompanying drawings and to the letters of reference marked thereon.

My trap is designed for catching various animals, as quadrupeds, fish and birds, and my invention or improvement consists in an arrangement of separate balanced fingers in connection with a peculiarly formed box for entrapping animals.

In the accompanying drawings Figure 1 represents a top view of my trap the wire work being removed to show more distinctly the fingers. Fig. 2, is a lateral view with one side removed; and Fig. 3, shows a connecting ring detached.

The general form of the body of my trap may be varied, but I prefer that of an oblong box made of wire work so woven that the meshes cannot be enlarged by the entrapped animal. I first take four pieces or strips of metal as seen at A, A, Fig. 2, and fasten them together by rivets or otherwise so as to form an outline or border to one side of the box or body of the trap. Then the wire is woven into this frame by interlocking the wires at every crossing. The top, bottom and ends of the box are made in the same manner; then these separate planes are set together in the form of a box and connected by open rings Fig. 3.

Upon the bottom of this box I place a smooth plate B, extending from one end into the trap beyond the points or tips of the fingers C. Between this plate, B, and the end piece or plane of the trap a space or doorway is left by adjusting the end piece so as to extend only about two-thirds of the way from the top of the box toward the bottom. Just above the doorway is arranged a series of fingers C, Fig. 1, supported upon a rod c, Fig. 2, so that each finger has an independent and free vibration. The operation of these fingers is shown in Fig. 2, where the tips of the fingers are represented in black lines as down and in red as up. The larger and shorter ends of the fingers are made hollow so as to conveniently receive weights for balancing the fingers, the weights being put into the holes i. Whether the trap be set in water or in air the tips of the fingers must slightly overbalance the other ends, so that an animal in entering the trap can easily raise the tips with his head or back. The tips of the fingers may be forked or barbed, the better to prevent animals from escaping from the trap. In order to adapt the trap to the different sizes of animals the fingers have a vertical adjustment by raising or lowering the rod c, Fig. 2, and the play of the tips is limited by the rods h, and which also have a vertical adjustment in the plates D. Between the fingers are guides g, supported on the bar h to prevent the fingers from being separated laterally or from being brought too near together. These guides are not always necessary.

In setting the trap the fingers and the end plane above them must be adjusted to the size of the animal to be entrapped so that he can almost enter without moving the fingers; then upon attempting to enter he touches the tips of the fingers which are easily raised but fall again the moment he has passed into the trap. On attempting to escape the animal is barbed by the tips of the fingers and he turns to some other point to find way of escape. As the fingers have an independent motion the second animal can freely enter without allowing the first to escape which is a very important advantage of my arrangement, over other similar traps.

The construction of my trap is such that the whole may be folded together for transportation by simply removing the end pieces and fingers. One of the side pieces falls, (in folding the trap) upon the bottom piece while the other falls down under the top piece, thus changing the form of the body from that of a box into that of the several planes of wire work which require little room for packing.

I am aware that the doors of traps have been so arranged that an animal when entering the trap could raise the door, which would fall again and prevent the escape of the animal, but a series of balanced fingers having a separate motion operates differently and more efficiently, therefore my invention is a great improvement over other traps of similar construction.

Having thus fully described my invention what I claim and desire to secure by Letters Patent of the United States is

The arrangement of the separate balanced fingers C, in connection with the box or body of the trap substantially as described for the purposes set forth.

REUBEN L. PAYNE.

Witnesses:
DANIEL BREED,
S. J. BOWEN.